Patented Mar. 19, 1946

2,397,065

UNITED STATES PATENT OFFICE 2,397,065

RECOVERY OF BUTYLENE GLYCOL FROM CARBOHYDRATE FERMENTATION MASHES

Robert Alan Walmesley, Dalry, and Walter Rowden Davis, Stevenston, Scotland, assignors to Imperial Chemical Industries Limited, a corporation of Great Britain No Drawing. Application June 20, 1944, Serial No. 541,274. In Great Britain May 6, 1943

9 Claims. (Cl. 260—637)

The present invention relates to the recovery of butylene glycol, and more particularly to 2:3 butylene glycol, from carbohydrate fermentation residues in which butylene glycol is formed as a major product of the fermentation, and in which no substantial amount of glycerine is formed. Such a product is obtained in bacterial fermentations of carbohydrate mashes with, for instance, Aerobacter aerogenes (Bacillus lactis aerogenes), under suitable conditions. With certain micro-biological organisms under specific conditions alcohol is also obtained as a major product, and in such fermentations the product contains the 2:3 butylene glycol and acetyl methyl carbinol in varying proportions according to the conditions under which the fermentation has been conducted.

In addition to the alcohol and acetyl methyl carbinol, the fermented mash contains organic and inorganic impurities derived from the unfermentable constituents of the carbohydrate mash and contains minor products of fermentation. The butylene glycol is thus accompanied in the fermented mash by other products of diversified physical and chemical characteristics, and the isolation and purification of the butylene glycol present constitute a problem of much greater difficulty than the recovery of alcohol and other easily volatile products capable of being distilled off before the bulk of the water is evaporated, since it is not possible to recover more than about 50 per cent of the butylene glycol in the aqueous distillate, since the non-volatile impurities present are of such a character that the fermentation residue becomes increasingly viscous as it is dried down, so that mechanical as well as chemical difficulties are encountered in the recovery of the butylene glycol remaining in the concentrate. Direct distillation of the evaporated residue has not provided an efficient method of recovering the butylene glycol as a high percentage of the glycol is retained by the residue after distilling as far as practicable, and the residue obtained from the distillation is of such physical characteristics that it is difficult to dispose of.

We have found that the recovery of butylene glycol is facilitated and that an easily handled solid residue may be obtained if a liquid and if necessary de-alcoholised carbohydrate fermentation residue concentrated to a suitably limited water content, for example to about 15–30 per cent, and containing the butylene glycol, but no substantial amount of glycerol, is treated with an alkaline earth material in quantity sufficient to form a cream containing an undissolved excess of alkaline earth metal hydroxide but insufficient to form a stiff paste, and the resulting cream is mixed with an alcohol of the saturated aliphatic monohydric series that is miscible with water in all proportions, in amount sufficient to precipitate the greater part of the impurities. These are obtained in a solid and easily separable condition, and the formation of an alcoholic extract relatively rich in butylene glycol and poor in non-volatile impurities is facilitated, from which product it is easy to obtain a high yield of pure butylene glycol.

According to the present invention therefore the method for recovering 2:3 butylene glycol from a liquid concentrate of a carbohydrate fermentation in which 2:3 butylene glycol is formed as one of the major portions of the fermentation and in which no substantial amount of glycerol is formed comprises treating the said concentrate with an alkaline earth material to form a flowable cream containing an undissolved excess of alkaline earth metal hydroxide, mixing the resulting cream with an alcohol of the saturated aliphatic monohydric series that is miscible with water in all proportions in amount and concentration sufficient to precipitate substantially the whole of the precipitable impurities, separating off the alcoholic liquid from the solid phase, and recovering 2:3 butylene glycol from the said alcohol.

The amount of water in the system during the treatment with the alkaline earth material and the aforesaid alcohol is advantageously not more than the combined weight of the butylene glycol and non-volatile impurities. After the resulting alcoholic extract containing the butylene glycol in solution has been separated from the solid residue, further purification treatment may be applied to the butylene glycol with excellent results.

In putting the invention into effect, it is convenient to employ ethyl alcohol as the water miscible alcohol, for instance industrial spirits, but other alcohols of the saturated aliphatic monohydric series that are miscible with water in all proportions, or mixtures thereof, may be employed. Since it is economically preferable to employ an alcohol containing a certain percentage of water rather than the anhydrous material, e. g. 90 per cent. to 94 per cent. ethyl alcohol, it will usually be desirable to reduce the water content of the still residue concentrate to less than 50 per cent. before adding alkaline earth material and the alcohol, but it is unnecessary to evaporate sufficient water to cause salts to crystallise from it when it cools, and it is also undesirable that it should be cooled to such a temperature as to become excessively viscous. We prefer to use the concentrate at a temperature of 40–80° C. in order to maintain it as fluid as possible, and the cream obtained on the addition of the lime is also maintained at a temperature at which it is fluid until the alcoholic extraction is to be commenced.

As alkaline earth material there may be employed an alkaline earth metal oxide or hydroxide; thus calcium oxide or hydroxide may be used in the form for instance of lime or slaked lime. The variety of slaked lime known as "Limbux" (a registered trade-mark) has been found to give particularly good results.

The alkaline earth material may be employed in the form of a fine dry powder, but preferably the fine dry powder is first made into a cream by mixing it with a portion of the alcohol to be used or a limited amount of water. It is then intimately mixed with the fermentation residue concentrate, which if necessary has been already dealcoholised before the removal of the bulk of the aqueous distillate containing a portion of the butylene glycol. The resulting cream containing the fermentation residue concentrate and alkaline earth material is then mixed with the alcohol, or the remaining portion of the alcohol, with agitation, and the agitation is continued until the particles of the precipitated impurities have become sufficiently hardened to prevent them sticking together when agitation is discontinued. Alternatively the precipitation of the precipitable impurities may be effected by extruding the said cream through fine orifices into the alcohol. The precipitate may then be allowed to settle and the extract formed may be decanted or otherwise separated from it or the precipitate and the alcoholic liquid may be separated by a mechanical classifier.

The amount of the alkaline earth material required per part butylene glycol in the concentrate is somewhat variable, but while there must be sufficient to leave an undissolved excess of the alkaline earth hydroxide there should not be employed enough to make it into a stiff paste. The number of mols. of alkaline earth material that must be added per mol. of butylene glycol before there is an undissolved excess in the concentrate depends largely on the nature and amount of the impurities present. Frequently the amount of alkaline earth material, calculated as lime, added to the liquid concentrate of a carbohydrate fermentation of approximately 25 per cent. water content is 8–12 per cent.

While satisfactory results are obtained provided the water content in the extraction mixture does not amount to more than the combined weight of the butylene glycol and nonvolatile impurities, the amount of the water content may advantageously be considerably less than this amount.

The solid residue from which the supernatant alcoholic extract has been removed should be washed with a further quantity of alcohol, and if desired the washing and precipitation may be carried out in counter-current stages, using the alcohol employed for washing the solid residue of one batch from which the main alcoholic extract has been removed for precipitation of the non-volatile impurities in the next batch. Simple mixing apparatus may be used for these operations. It will usually be desirable that the butylene glycol concentration of the alcoholic extract should be about 10–25 per cent.

The washed residue is a non-hygroscopic granular solid which does not become sticky when heated, and may be dried off, for instance by heating it in a rotary drier under reduced pressure. It can be used as a fertilizer or as a material for the recovery of potassium salts. The alcohol vaporised from it can be recovered.

On evaporation of the alcohol from the alcoholic extract there is obtained a crude aqueous butylene glycol, still containing a certain amount of impurity, which may be concentrated by further evaporation of water. The alcohol may be rectified. The butylene glycol concentrate may advantageously be further purified, for instance by fractional distillation after the addition of a small excess of caustic soda, as at this stage the reaction may be slightly acid, with or without injected steam, or by extraction of the butylene glycol with a substantially water immiscible volatile organic nitrogen base such as aniline, separation of the resulting extract from the insoluble residue and recovery of the butylene glycol from the said extract by further extraction with water and subsequent fractional distillation.

The advantages of the invention include the mechanical convenience of the process, in that the still residue liquor reuqires no purification previous to its extraction with the alcohol, but only concentration and treatment with the alkaline earth material, and in that until after the alcohol has been introduced the material that is treated has a fluid consistency and the residue from the alcoholic extraction is a powdery solid. The cost of the reagents consumed is desirably little.

The invention is applicable to the recovery of butylene glycol from fermented mashes obtained from many carbohydate materials, for instance cane molasses, crude cane sugar, grain or beet molasses.

Acetyl methyl carbinol is more volatile than butylene glycol, and is easily eliminated in the fractional distillation.

The following example, in which the parts mentioned are parts by weight, illustrates the invention.

One hundred parts by weight of the fermented liquor obtained by inoculating a solution of 8 parts of sucrose (added in the form of molasses or cane syrup) in 100 parts of solution containing the necessary inorganic nutrients, for example, nitrogen, phosphate, sulphate, and magnesium, with an appropriate organism, e. g. aerobacter, aerobacillus or aeromonas, is fed to a forced circulation vacuum evaporator. The water is evaporated at reduced pressure and the condensate is collected for recovery of the 2:3 butylene glycol volatilised with the evaporated water, until a concentration to 5 parts by weight has been effected. The concentrated residue contains 2.1 parts of butylene glycol, 1.5 parts solid impurities from the mash and 1.5 parts by weight of water.

The condensate consists of a 2.0% solution of butylene glycol in water and this is rectified in a suitable column for the separation of concentrated butylene glycol, the water vaporised passing to waste and the recovery being 95% or over of the glycol present.

10% of its weight (0.5 part) of dry powdered lime (Limbux) mixed to a cream with an equal weight of 92% ethyl alcohol is added to the concentrate in a mechanical homogeniser and the resulting thick cream is extruded in a thin stream into 20 parts of 92% alcohol contained in a cylindrical mixer fitted with friction cone, propeller or other means of ensuring gentle circulation of the precipitating liquid. After 30 minutes gentle mixing the combined liquid and solids are allowed to flow into a receiver in which the solids are allowed to settle, forming a bed of hard granular porous material and the liquid containing the bulk of the extracted 2:3 butylene glycol is drained off. The residue is washed with a further volume of fresh alcohol 92%. The alcohol extract containing approximately 10% by weight of glycol and 4% by weight of extracted solid impurities is fed to a suitable column for the recovery of alcohol as 92% by weight spirit and separation of the extracted glycol in the form of a concentrated aqueous solution free from alcohol and containing glycol to solid impurities in the approximate ratio of 70:28. The recovered alcohol is re-utilised in a further extraction.

The crude concentrated butylene glycol is made slightly alkaline by the addition of sodium hydroxide and is then transferred to a vacuum still of the forced circulation type, e. g. circulation by external pump and the glycol distilled under reduced pressure, a suitable device for the collection of the strong distillate, e. g. a packed hot condenser being utilised in the design of the still head. Closed steam at 120–200 lbs. sq. in. pressure is a convenient heating medium and no live steam is injected. When concentration has reached the point at which the residue is so viscous that it no longer circulates freely through the calandria, the residue is discharged whilst hot and still fairly fluid. The residue contains approximately 12% of residual glycol and 88% solids.

The distillate is combined with that from the original evaporation, redistilled and if a water white product is required, passed through a bed of activated charcoal at a concentration of 50% and a temperature of 80–95° C. and subsequently reconcentrated.

The recovery of chemically pure butylene glycol is 90% of the glycol present in the fermented liquor.

We claim:

1. A method for recovering 2:3 butylene glycol from a liquid concentrate of a carbohydrate fermentation in which 2:3 butylene glycol is formed as one of the major portions of the fermentation and in which no substantial amount of glycerol is formed which comprises treating the said concentrate, in which the water content has been reduced to less than 50% of the weight of said concentrate, with an alkaline earth compound of the group consisting of oxides and hydroxides to form a flowable mass of cream-like consistency containing an undissolved excess of alkaline earth metal hydroxide mixing the resulting mass with an alcohol of the saturated aliphatic monohydric series that is miscible with water in all proportions, the amount of alcohol being sufficient to precipitate substantially the whole of the precipitable impurities, separating off the alcoholic liquid from the solid phase, and recovering 2:3 butylene glycol from the said alcoholic liquid.

2. A method as claimed in claim 1 wherein the liquid concentrate of a carbohydrate fermentation is a concentrate from the fermentation of cane molasses.

3. A method as claimed in claim 1 wherein the amount of water present in the mass during the treatment with the alkaline earth material and the aforesaid alcohol is not more than the combined weight of the 2:3 butylene glycol and non-volatile impurities present in the original liquid concentrate.

4. A method as claimed in claim 1 wherein the alkaline earth material is added as a fine dry powder.

5. A method as claimed in claim 1 wherein the alkaline earth compound employed is slaked lime.

6. A method as claimed in claim 1 wherein the alkaline earth compound employed is lime.

7. A method as claimed in claim 1 wherein the alkaline earth compound employed is first made into a cream by mixing it with a portion of the alcohol to be used.

8. A method as claimed in claim 1 wherein the alcohol of the saturated aliphatic monohydric series that is miscible with water in all proportions is ethyl alcohol.

9. A method for recovering 2:3 butylene glycol from a liquid concentrate of a carbohydrate fermentation in which 2:3 butylene glycol is formed as one of the major portions of the fermentation and in which no substantial amount of glycerol is formed, which comprises treating the said concentrate, in which the water content has been reduced to approximately 25% of the weight of said concentrate, with from 8% to 12% of a calcium compound of the group consisting of oxide and hydroxide, mixing the resulting mass with sufficient monohydric saturated aliphatic alcohol, which is miscible with water in all proportions, until substantially all of the precipitable impurities in the mass have been precipitated, the total amount of water present in the mass during the treatment with the calcium compound and the alcohol being not more than the combined weight of the 2:3 butylene glycol and the non-volatile impurities present in the liquid concentrate.

ROBERT ALAN WALMESLEY.
WALTER ROWDEN DAVIS.